United States Patent
Lee et al.

(10) Patent No.: US 9,500,305 B2
(45) Date of Patent: Nov. 22, 2016

(54) FITTING MECHANISM FOR USE WITH MULTILAYER COMPOSITE PIPE

(71) Applicant: LORDO AMERICA, Torrance, CA (US)

(72) Inventors: Jun Bae Lee, Seoul (KR); Kyung Wook Ahn, Anyang (KR)

(73) Assignee: LORDO AMERICA, Torrance, CA (US)

( * ) Notice: Subject to any disclaimer, the term of this patent is extended or adjusted under 35 U.S.C. 154(b) by 0 days.

(21) Appl. No.: 14/864,786

(22) Filed: Sep. 24, 2015

(65) Prior Publication Data

US 2016/0215906 A1    Jul. 28, 2016

(30) Foreign Application Priority Data

Jan. 26, 2015   (KR) .................. 10-2015-0012166
May 22, 2015   (KR) .................. 10-2015-0071546

(51) Int. Cl.
| | |
|---|---|
| F16L 25/00 | (2006.01) |
| F16L 13/16 | (2006.01) |
| F16L 15/04 | (2006.01) |
| F16L 15/08 | (2006.01) |

(52) U.S. Cl.
CPC ............. *F16L 13/168* (2013.01); *F16L 15/04* (2013.01); *F16L 15/08* (2013.01)

(58) Field of Classification Search
USPC ............... 285/353, 40, 45, 55, 384, 385
See application file for complete search history.

(56) References Cited

U.S. PATENT DOCUMENTS

| | | | | |
|---|---|---|---|---|
| 1,969,142 A * | 8/1934 | McIntyre | ................. | F16L 19/14 285/339 |
| 2,797,474 A * | 7/1957 | Main, Jr. | ............... | F16L 33/223 285/110 |
| 4,488,738 A * | 12/1984 | Valdes | .................. | F16L 15/001 285/251 |
| 4,997,214 A * | 3/1991 | Reese | ..................... | F16L 47/24 228/173.4 |
| 5,992,898 A * | 11/1999 | Saylor | ................... | F16L 37/088 285/276 |
| 6,059,321 A * | 5/2000 | Lyall, III | ............. | F16L 21/022 285/139.1 |
| 6,276,728 B1 * | 8/2001 | Treichel | ............. | F16L 25/0036 285/249 |
| 7,686,352 B2 * | 3/2010 | Preston | ................ | F16L 19/061 285/382 |
| 8,758,609 B2 * | 6/2014 | Reinhardt | ............... | F16L 19/02 137/798 |
| 2005/0253386 A1 * | 11/2005 | Glaze | ....................... | B25B 7/02 285/353 |

FOREIGN PATENT DOCUMENTS

| | | |
|---|---|---|
| JP | H08-178141 A | 7/1996 |
| JP | 2008-82373 A | 4/2008 |
| KR | 10-2010-0008435 A | 1/2010 |
| KR | 10-0989211 B1 | 10/2010 |

* cited by examiner

*Primary Examiner* — Aaron Dunwoody

(57) ABSTRACT

The present invention provides a fitting mechanism capable of distributing pressure applied on an outermost layer of plastic, and contributing to cooperation and complementary reaction between a fitting body and a ferrule body under severe temperature change. A fitting mechanism according to the present invention comprises a fitting body formed of metal, and a ferrule body formed of metal, wherein the fitting body is coupled to the ferrule body by fastening the third threaded portion of the ferrule body with the second threaded portion of the fitting body, and the fitting body slope surface is impinged onto the ferrule body slope surface forming a fluid tight contact and causing the ferrule body deformation portion to be deflected inwardly, tightened around and penetrate into outermost layer of plastic, and the outermost layer of plastic of the leading end of the multilayer composite pipe impinges onto coupling end portion.

7 Claims, 2 Drawing Sheets

FITTING MECHANISM FOR USE WITH MULTILAYER COMPOSITE PIPE

CROSS-REFERENCE TO RELATED APPLICATIONS

This application claims priority from and the benefit of Korean Patent Application Nos. 10-2015-0012166, filed on Jan. 26, 2015, and 10-2015-0071546, filed on May 22, 2015, which are hereby incorporated by reference for all purposes as if fully set forth herein.

BACKGROUND OF THE INVENTION

1. Field of the Invention

The present invention relates to a fitting mechanism for use with multilayer composite pipe having an outermost layer is formed of plastic and an inner layer formed of metal, more particularly, to a fitting mechanism, which is capable of coupling the multilayer composite pipe with other piping element in a fluid tight manner, even when being used under the high-temperature, high-pressure environment or the environment that a temperature deviation is severe.

2. Discussion of the Background

In various conduits (e.g., tube, pipe) used as a means for delivering fluid, a configuration and material of a fitting used for fluid tight connection depend on characteristics thereof.

For example, a ferrule type fitting mechanism has been mainly employed in a metal pipe, which is usually used as a high-pressure pipe. Further, in the case of a plastic pipe which is used at a relatively low pressure, a fusion bonding method between plastics, or a method for connecting pipes by applying a pressure to a sleeve, or a bite type method by a simple one-touch has been widely used.

Nowadays, a plastic multilayer composite pipe, which has been used as a water pipe or a low-pressure gas pipe, begins to be used as a high-pressure pipe, trying to develop fittings suitable therefor. However, most of newly developed fittings are based on conventional fitting mechanisms suitable for metal pipe, which in turn decreases reliability and imposes a large economic burden in installation of such fitting.

In particular, a method for installing a fitting body inside a pipe and compressing a sleeve from the outside has a drawback that the fitting body installed inside the pipe hinders a fluid flowing through the pipe to degrade efficiency of the overall system.

Further, when the fitting is mounted in a system, such as an air conditioner, in which a connection part is made of copper based alloy, the fitting body needs to be made of copper alloy such as brass to prevent Galvanic corrosion, which leads to a lower connection strength compared with iron, thus reducing the fluid-tightness.

Further, when such fitting is installed at a place where temperature change is severe, the fitting is repeatedly contracted and expanded in response to a change in temperature, and therefore, a risk of leakage may be increased.

In case where a fitting is made of iron, a plurality of separate plastic parts need to be coupled between metals for inter-metal insulation, which leads to an increase in economic burden and structure complexity.

As a representative fitting mechanism, which is capable of being coupled to an outer surface of pipe without hindering a flow of fluid inside the pipe, there is a typical method of using a ferrule. This fitting mechanism is generally employed to metal pipe, and has been widely used in, for example a semiconductor line, etc.

The ferrule type fitting can be divided into a front ferrule part and a rear ferrule part, and can maintain fluid-tightness by deforming the front ferrule with a compressive force of the rear ferrule while adhering it to an outer layer of pipe and a fitting body. Further, in recent years development for a single ferrule has been progressed, and some single ferrules are used in some fields.

However, the ferrule type fitting mechanism is not developed for a multilayer composite pipe having a plastic outermost layer, and therefore design criteria for such ferrule type fitting mechanism is unnecessarily excessive. Therefore, using such ferrule type mechanism may increase an economic burden. And, when coupling the ferrule type mechanism to the plastic outermost layer having very lower stiffness may cause an excessive compressive force to be generated thereon, which may lead to breakage of the outermost layer and leakage.

Further, when the ferrule type fitting mechanism is used for a long time under high pressure at a place where temperature change is severe, a micro gap may be generated between metal and plastic due to the thermal expansion coefficient difference therebetween to cause leakage. In particular, a pressure is concentrated on the coupled portion of the ferrule with the outer cover of the pipe under the high-temperature environment of 70° C. or more and thus the outer cover plastic cannot stand the pressure to be damaged.

Therefore, the fitting mechanism of the typical ferrule type may not be used under the high temperature and the high pressure.

SUMMARY OF THE INVENTION

The present invention provides a fitting mechanism, which by configuring a fitting body to be fixed to an outermost plastic layer of pipe with a screw and configuring a ferrule body to be integrally simplified, can distribute pressure applied on an outermost layer of pipe under high pressure, and can contribute the cooperation and complementary reaction between the fitting body and the ferrule body under severe temperature change.

An object of the present invention is to provide a fitting mechanism for a multilayer composite pipe which is coupled with an outermost plastic layer thereof not to hinder a flow of fluid when it is used under the high-pressure environment.

Another object of the present invention is to provide a fitting mechanism for a multilayer composite pipe, which is capable of doubly guaranteeing a fluid-tightness effect by changing the conventional ferrule type fitting mechanism and introducing a combined type fitting mechanism suitable for an outermost layer of plastic.

Still another object of the present invention is to provide a fitting mechanism for a multilayer composite pipe, which is capable of being used even under a severe temperature change environment by minimizing damage of fluid-tightness due to a difference in thermal expansion coefficients between metal and plastic of the multilayer composite pipe.

In order to achieve the above objects of the present invention, a characteristic configuration of present invention is provided as follows.

According to one aspect of the present invention, there is provided a fitting mechanism for a multilayer composite pipe having an outermost layer of plastic and an inner layer of metal, the fitting mechanism including:

a fitting body formed of metal, the fitting body including:
a first threaded portion formed on an inner surface of the fitting body, which is coupled with the outermost layer of plastic;
a second threaded portion formed on the inner surface adjacent to an inlet of the fitting body, through which a leading end of the multilayer composite pipe is inserted into the fitting body;

a coupling end portion formed on a portion of the fitting body opposite to the inlet with respect to the first threaded portion; and an fitting body slope surface formed on the inner surface between the first threaded portion and the second threaded portion; and a ferrule body formed of metal, the ferrule body including:

a ferrule body slope surface formed on a leading end portion of the ferrule body;

a third threaded portion formed on an outer surface of the ferrule body to be coupled with the second threaded portion; and a ferrule body deformation portion disposed on an end of the ferrule body slope surface opposite to the third threaded portion, wherein when the fitting body is coupled to the ferrule body by fastening the third threaded portion of the ferrule body with the second threaded portion of the fitting body, the fitting body slope surface is impinged onto the ferrule body slope surface forming a metal-to-metal fluid tight contact therebetween and causing the ferrule body deformation portion to be deflected inwardly, tightened around and penetrate into the outermost layer of plastic, and the outermost layer of plastic of the leading end of the multilayer composite pipe disposed within the fitting body impinges onto the coupling end portion forming a fluid tight contact therebetween.

The fitting mechanism can further include a metal layer contact prevention means disposed between the coupling end portion of the fitting body and the leading end of the multilayer composite pipe.

The fitting mechanism can further include a fitting body sealing slope surface and a ferrule body sealing slope surface, which are configured to be continued to the fitting body slope surface and the ferrule body slope surface, respectively, and which have the same angle, wherein when the fitting body is coupled to the ferrule body by fastening the third threaded portion of the ferrule body with the second threaded portion of the fitting body, the fitting body sealing slope surface impinges onto the ferrule body sealing slope surface to form a metal to metal sealing contact therebetween.

The fitting mechanism can further include: an inner tightening portion which is a tapered portion disposed between the coupling end portion of the fitting body and the first threaded portion, wherein when the fitting body is coupled to the ferrule body by fastening the third threaded portion of the ferrule body to the second threaded portion of the fitting body, the outermost layer of plastic is compressed by the inner tightening portion to form a fluid tight contact therebetween.

According to another aspect of the present invention, there is provided a fitting mechanism for use with multilayer composite pipe having an outermost layer of plastic and an inner layer of metal, the fitting mechanism including:

a fitting body formed of metal, the fitting body including:

a first threaded portion formed on an inner surface of the fitting body, which is coupled with the outermost layer of plastic;

a second threaded portion formed on the inner surface adjacent to an inlet of the fitting body, through which a leading end of the multilayer composite pipe is inserted into the fitting body;

a coupling end portion formed on a portion of the fitting body opposite to the inlet with respect to the first threaded portion; and an fitting body slope surface formed on the inner surface between the first threaded portion and the second is threaded portion; and a ferrule body formed of metal, the ferrule body including:

a ferrule body slope surface formed on a leading end portion of the ferrule body;

a third threaded portion formed on an outer surface of the ferrule body to be coupled with the second threaded portion; and a ferrule body deformation portion disposed on an end of the ferrule body slope opposite to the third threaded portion; and a metal layer contact prevention means disposed between the coupling end portion of the fitting body and the leading end of the multilayer composite pipe disposed within the fitting body, wherein a portion of the outermost layer of plastic of the leading end of the multilayer composite pipe within the fitting body is removed exposing the inner layer of metal, and wherein when the fitting body is coupled to the ferrule body by fastening the third threaded portion of the ferrule body with the second threaded portion of the fitting body, the fitting body slope surface is impinged onto the ferrule body slope surface forming a metal-to-metal fluid tight contact therebetween and causing the ferrule body deformation portion to be deflected inwardly, tightened around and penetrate into the outermost layer of plastic, and the leading end of the multilayer composite pipe impinges onto the metal layer contact prevention means forming a fluid tight contact between the leading end of the multilayer composite pipe, the metal layer contact prevention means and the coupling end portion.

The fitting mechanism can further includes: an inner tightening portion which is a tapered portion disposed between the coupling end portion of the fitting body and the first threaded portion, wherein when the fitting body is coupled to the ferrule body by fastening the third threaded portion of the ferrule body to the second threaded portion of the fitting body, the outermost layer of plastic is compressed by the inner tightening portion to form a fluid tight contact therebetween.

A fitting mechanism for multilayer composite pipe according to the present invention can achieve the following effects:

As the fitting body and the outermost layer of plastic are coupled to each other with a simple structure for fluid-tightness, the coupling operation or process therebetween can be done easily. Further, despite of the simple structure, the fluid-tightness therebetween can be reliably maintained in a high temperature environment or in a high pressure environment.

Further, the fitting mechanism can be manufactured at low cost. And, as it is designed by taking into consideration temperature expansion coefficients of metal and plastic, the reliability of fluid-tightness can be highly improved, so that it is possible to use the fitting mechanism in a high pressure environment or in a severe temperature change environment.

As the length of the coupling portion is not changed by a fastening force applied by an assembler, uniform product effect can be obtained. Additionally, as the metal layer contact prevention means can compensate for a length shortage in pipe caused by the non-uniformity of pipe or cutting error, leakage can be securely prevented.

DETAILED DESCRIPTION OF THE ILLUSTRATED EMBODIMENTS

To solve the technical problems as described above, exemplary embodiments of the present invention will be described below with reference to the accompanying drawings.

Figure 1:
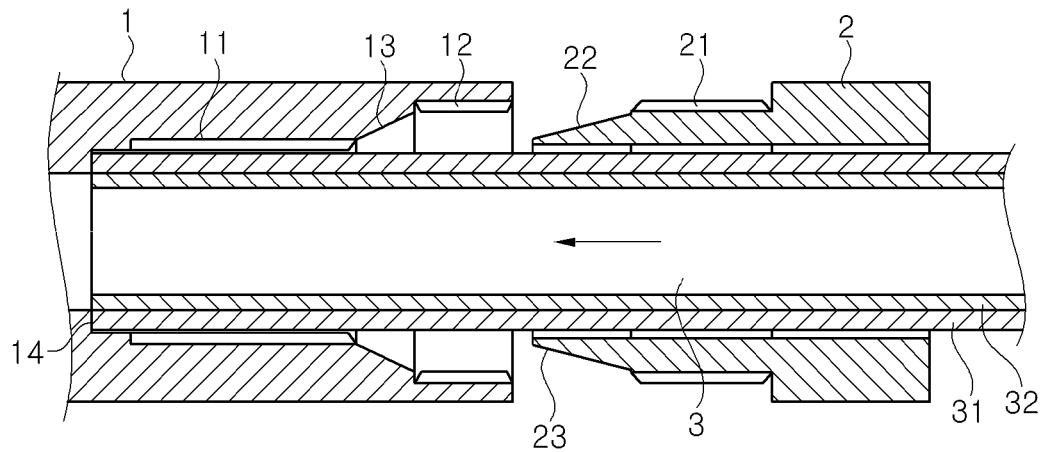
FIG. 1 is a cross-sectional view of a fitting mechanism for multilayer composite pipe according to an exemplary embodiment of the present invention before being completely coupled.

FIG. 1 is a cross-sectional view of a fitting mechanism for use with a multilayer composite pipe according to an exemplary embodiment of the present invention before being completely coupled.

A basic structure is configured to include a fitting body 1, a ferrule body 2, and a multilayer composite pipe 3 having at least two layers.

The fitting body 1 and the ferrule body 2 may be made of same or different metal material usually used in the art, such as stainless steel and brass, and the multilayer composite pipe 3 may include a plastic layer 31, which forms an outermost cover, and a metal layer 32.

The plastic layer 31 may be formed of polymer such as polyethylene. The material for the metal layer 32 can be determined depending on what the multilayer composite pipe is used for. Generally, cheap aluminum has been widely used.

Although not illustrated, the multilayer composite pipe 3 may also have a triple-layered structure of a plastic-metal-plastic layer.

As shown in FIG. 1, the fitting body 1 has an inner surface provided with a first threaded portion 11 formed thereon for being coupled with the plastic layer 31, i.e., the outer cover of the multilayer composite pipe 3, and an inlet for allowing the insertion of the multilayer composite pipe 3 thereinto. On the inner surface adjacent to the inlet is formed a second threaded portion 12 for being coupled with a third threaded portion 21 provided on an outer surface of the ferrule body 2.

A fitting body slope surface 13 having a predetermined angle is provided between the first threaded portion 11 and the second threaded portion 12 of the fitting body 1, and a ferrule body slope surface 22 is provided at one end (or leading end) of the ferrule body 2, so that when the fitting body slope surface 13 impinges completely onto the ferrule body slope surface 22, a metal to metal contact therebetween can form a fluid tight seal.

A coupling operation or process of the multilayer composite pipe 3 with the fitting mechanism is as follows.

First, due to a rotational torque applied by an assembler or fabricator to the fitting body 1, the multilayer composite pipe 3 is coupled with the first threaded portion 11, while being moved to the left or inward of the fitting body 1, as indicated by an arrow in FIG. 1.

When a leading end of the multilayer composite pipe 3 reaches and impinges onto a coupling end portion 14 of the fitting body 1, a fluid tight structure can be formed by close contact between the coupling end portion 14 and the plastic layer 31.

Here, the coupling end portion 14 has an inner radius selected not to contact the metal layer 32 of the multilayer composite pipe 3.

With such configuration, Galvanic corrosion, which otherwise would be induced by a direct contact between the fitting body 1 and the metal layer 32 of the multilayer composite pipe 3 having different kinds of metal materials, can be prevented.

When the coupling of the multilayer composite pipe 3 with the fitting body 1 is completed, the ferrule body 2 begins to be moved toward the fitting body 1 and rotated while the third threaded portion 21 is fastened to the second threaded portion 12.

Figure 2:
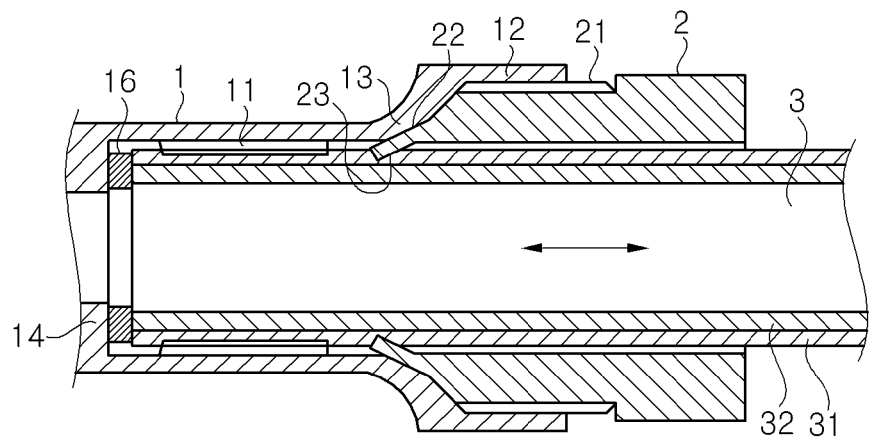
FIG. 2 is a cross-sectional view of a fitting mechanism for multilayer composite pipe according to another exemplary embodiment of the present invention after being coupled.

FIG. 2 is a cross-sectional view of the fitting mechanism for multilayer composite pipe according to another exemplary embodiment of the present invention after being coupled.

As the second threaded portion 12 of the fitting body 1 is coupled with the third threaded portion 21 of the ferrule body 2, a ferrule body deformation portion 23 which constitutes a leading end of the ferrule body 2 is deflected inward of the multilayer composite pipe 3, tightened around and penetrates into the outermost plastic layer 31 of the multilayer composite pipe 3.

The coupling between the first threaded portion 11 of the fitting body 1 and the plastic layer 31 of the multilayer composite pipe 3 compensates for the disadvantage of the conventional simple ferrule fitting.

In other words, a conventional ferrule is generally divided into a front ferrule and a rear ferrule, in which one end of the front ferrule is deformed by compression of the rear ferrule and is tightened around the pipe.

If a ferrule with such configuration is similarly utilized for a multilayer composite pipe having an outermost plastic layer, load is concentrated on a coupled portion between the ferrule body deformation portion 23 of the ferrule body 2 and the plastic layer 31. As a result, the plastic layer 31 cannot withstand the concentrated load or stress under the high-temperature or high-pressure environment, and thus the outer cover, i.e., the plastic layer 31 may be damaged to be broken or peeled off.

Therefore, the conventional techniques cannot be applied to the multilayer composite pipe as it is.

The first threaded portion 11 of the fitting body 1 can distribute a load applied to the coupled portion, which helps the outermost plastic layer 31 can withstand even under the high-temperature and high-pressure environment.

In particular, when the fluid tight structure is formed by the coupling end portion 14 of the fitting body 1, the pipe is expanded by an internal pressure of the pipe to make the plastic layer 31 further impinge onto the first threaded portion 11, thereby inviting an improved effect of the fluid tight action.

One fluid tight portion formed by the coupling between the coupling end 14 of the fitting body 1 and the leading end of the multilayer composite pipe 3, and another airtight portion formed by the coupling between the ferrule body deformation portion 23 of the ferrule body 2 and the plastic layer 31 of the multilayer composite pipe 3 keep a complementary relationship to each other and cooperate with each other, which is described below.

In case where the ferrule body 2 moves to the right in the drawing due to disturbances such as external impact, vibrations, and a temperature change causing the coupling of the ferrule body deformation portion 23 to be loosened with the risk of leakage increased, the fitting body 1 can also move to the right, so that the fluid-tightness between the leading end of the multilayer composite pipe 3 and the coupling end portion 14 of the fitting body 1 is maintained strong. On the contrary, in case where the coupling end portion 14 moves to the left causing the risk of leakage, the ferrule body 2 also moves to the left, so that the coupling of the ferrule body deformation portion 23 and the plastic layer 31 is strengthened to abate the risk of leakage.

Such complementary behavior can form a more effective fluid tight structure beyond a mere double fluid tight structure.

As shown in FIG. 2, the leading end of the multilayer composite pipe 3 and the coupling end portion 14 of the fitting body 1 are not in direct contact with each other, and a washer-shaped metal layer contact prevention means 16 to be described below is provided between the leading end of the multilayer composite pipe 3 and the coupling end portion 14 of the fitting body 1.

Like the case in which the metal layer 32 of the multilayer composite pipe 3 is made of aluminum and the fitting body 1 is made of brass, direct contact between different kinds of metals can cause Galvanic corrosion. Therefore, as described above, the coupling end portion 14 is configured to have the inner radius in such a manner that it is in contact only with the plastic layer 31 which is positioned at the outermost portion of the multilayer composite pipe 3, or as illustrated in FIG. 2, the metal layer contact prevention means 16 is provided between the coupling end portion 14 and the distal end of the multilayer composite pipe 3.

The metal layer contact prevention means 16 can prevent Galvanic corrosion and also improve the fluid-tightness.

That is, when the outer cover of the pipe 3 mainly formed of polyethylene is coupled with the fitting body 1 directly contacting the fitting body 1, there may be a problem with the fluid-tightness due to thermal characteristic, an elastic coefficient, or a thermal expansion rate thereof under a high temperature environment or a severe temperature change environment. In order to improve the fluid-tightness, the metal layer contact prevention means 16 is preferably made of a Teflon-based material or silicon rubber having more excellent thermal characteristic or elastic coefficient than the polyethylene. Further, in the case of using the silicon rubber, it is preferable to use the silicon rubber having high hardness, for example, 60 to 80 (durometer A) so that the silicon rubber is not severely deformed by being compressed between the multilayer composite pipe 3 and the fitting body 1.

The metal layer contact prevention means 16 is compressed while resisting against the rotational torque of the multilayer composite pipe 3, and therefore it is important to appropriately select a thickness and an area of the metal layer contact prevention means 16 so that the metal layer contact prevention means 16 is not folded or deformed.

The ferrule body slope surface 22 just on the ferrule body deformation portion 23 which is the leading end portion of the ferrule body 2 penetrating into the outer cover of the multilayer composite pipe 3 forms fluid-tightness by the metal to metal contact with the fitting body slope surface 13.

The function of the ferrule body deformation portion 23 may be similar to that of the conventional ferrule, but the ferrule body deformation portion 23 is different from the conventional ferrule in that the deformation range of the ferrule body deformation portion 23 is relatively large and an insertion angle thereof has a larger value than before.

An insertion length may range from 1.5 to 3 mm and the insertion angle may be set to be 25 to 35°.

Further, in the case of the single ferrule of the conventional technology, to contribute to fluid-tightness by the metal contact, appropriate grooves or wedge-shaped deformation portions, etc. are formed in several portions of the ferrule, but the present invention employs an additional slope surface to be described below.

Further, appropriate grooves may be formed inside or outside of the ferrule body 2 so as to allow the ferrule body deformation portion 23 to be deformed having a desired shape contributing to fluid-tightness.

The fluid-tightness by the direct contact between the respective slope surfaces 13 and 22 depends on surface roughness of the fitting body slope surface 13. So, if the surface roughness is not sufficient, there may be a small amount of leakage.

Further, if the contact with the upper portion of the ferrule body deformation portion 23 is not completed due to the machining error of the ferrule body 2, or if the pipe is not uniform, and thus a part of the ferrule body deformation portion 23 is deformed by a non-uniformly applied force, there may be a small amount of leakage through the metal to metal fluid tight part which is the upper portion.

Further, movement distance (i.e., the final position in the fitting body 1) of the ferrule body 2 is varied depending on a force applied by a fabricator, and thus there is the possibility that the uniform performance may not be exhibited by the fitting mechanism.

Figure 3:
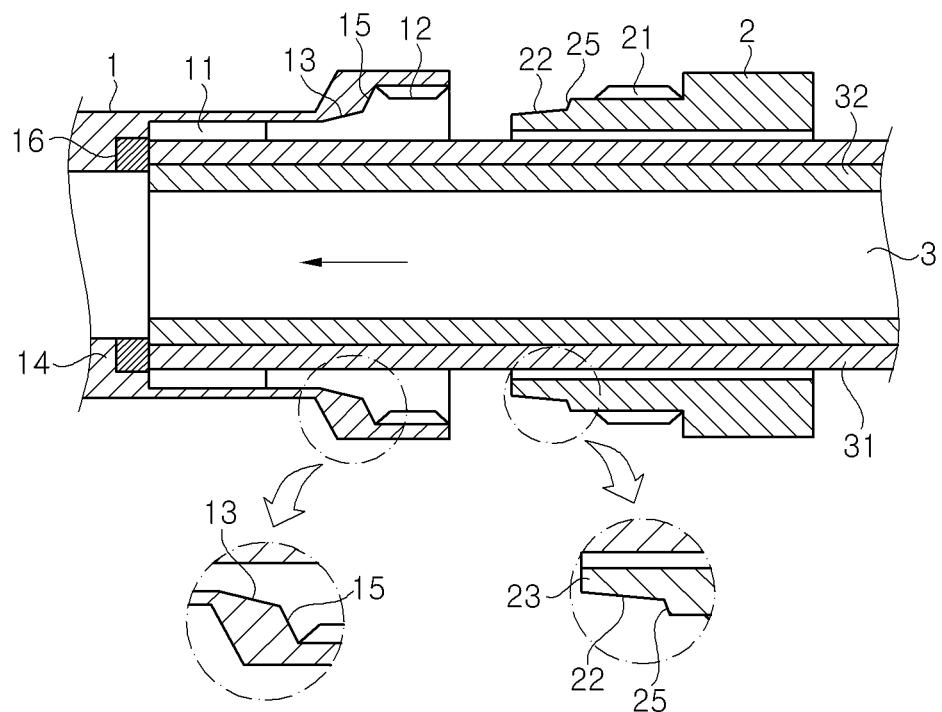
FIG. 3 is a cross-sectional view of a fitting mechanism for multilayer composite pipe according to still another exemplary embodiment of the present invention before being completed coupled.

Referring to FIG. 3, there are shown the slope surfaces 15 and 25, which are additionally provided on or adjacent to the fitting body slope surface 13 and the ferrule body slope surface 22, respectively.

The fitting body slope surface 13 of the fitting body 1 is continuously connected to the fitting body sealing slope surface 15, a slope angle of which is different from that of the fitting body slope surface 13, and the upper end of the ferrule body slope surface 22 is continuously connected to the ferrule body sealing slope surface 25, a slope angle of which is different from that of the ferrule body slope surface 22 but equal to the slope angle of the fitting body sealing slope surface 15.

Therefore, as the ferrule body 2 is moved in a direction illustrated by an arrow in FIG. 3 by an assembling torque, the ferrule body deformation portion 23 is coupled with the multilayer composite pipe 3 while penetrating into the outer cover of the multilayer composite pipe 3 at a predetermined penetration angle, and the metal to metal fluid-tightness is formed by the contact between the fitting body slope surface 13 and the ferrule body slope surface 22. Further, the additional fluid-tightness is formed by the contact between the fitting body sealing slope surface 15 and the ferrule body sealing slope surface 25.

Generally, a slope angle difference between the fitting body slope surface 13 and the ferrule body slope surface 22 is in a range between 1 and 10 degree, which contributes to the smooth deformation greater than a predetermined value, so as to achieve firm coupling with the outer layer, but the two slope surfaces 15 and 25 are preferably formed to have the same slope angle as they are additionally provided only to prevent leakage.

Another advantage of the additionally provided two slope surfaces 15 and 25 is to help an assembler to ascertain the coupling extent when he or she applies a torque to the ferrule body 2 to be coupled with the fitting body 1.

In a case where two slope surfaces 15 and 25 are not formed, the assembler would be likely to fasten insufficiently the ferrule body 2 to the fitting body 1 causing the risk of leakage, or would be likely to fasten excessively the ferrule body 2 to the fitting body 1 causing the damage in the second and third threaded portions 12 and 21.

This may occur more often when the slope angle of the ferrule body slope surface 22 is less, and the ferrule body 2 is made of brass.

On the contrary, when the fitting body sealing slope surface 15 and the ferrule body sealing slope surface 25 which have a greater slope angle are provided as describe above, the assembler can recognize that the assembling needs to be performed until the two sealing slope surfaces completely contact to each other, and that after the two sealing slope surfaces contact to each other, further movement of the ferrule body 2 can be no longer performed by the previously applied torque, which indicates the completion of assembling.

Figure 4:
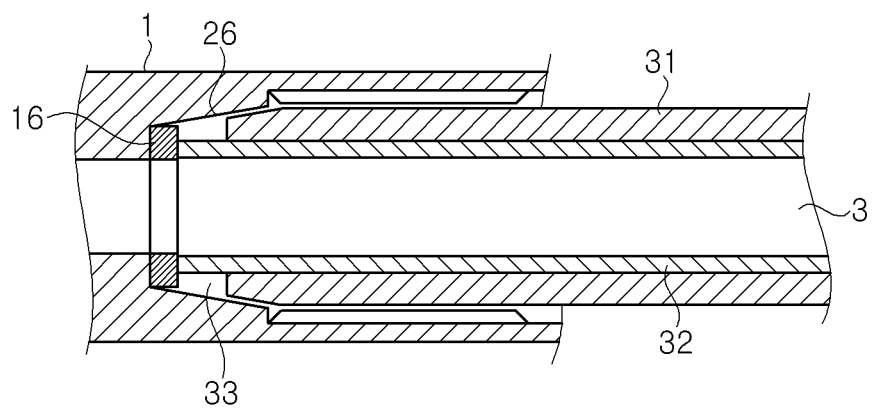
FIG. 4 is a partial cross-sectional view of a fitting mechanism for multilayer composite pipe according to still another exemplary embodiment of the present invention.

To prevent leakage caused by the sudden changes in temperature, as illustrated in FIG. 4, the assembling can be performed with a modified leading end of the multilayer composite pipe 3.

For convenience of explanation, the ferrule body 2 and the inlet portion of the fitting body 1 are omitted in FIG. 4. At the place where the direct contact between metal and plastic is made, leakage may occur due to the deterioration of tightness therebetween caused by the huge difference in thermal expansion coefficients of the metal and the plastic. The risk of leakage due to the difference in a thermal expansion coefficient can be greatly reduced by forming a plastic removed portion 33 at a leading of the pipe 3 and coupling the fitting body 1 with the multilayer composite pipe 3.

Further, the metal layer 32 directly impinges onto the metal layer contact prevention means 16. Additionally, since the stiffness of the metal layer 32 is greater than that of the plastic layer 31, a compressive force exerted to the metal layer contact prevention means 16 by the metal layer 32 can be significantly increased by the assembler's rotational torque, thus improving fluid-tightness.

Turning to FIG. 4, an inner tightening portion 26 may be formed to form an additional fluid-tight structure, which can be provided by forming a tapered part having an inner diameter gradually decreased from the inlet and less than an outer diameter of the multilayer composite pipe 3, so that the leading end of the pipe 3 can be tightened by the inner surface of the inner tightening portion 26.

As described above, the exemplary embodiments of the fitting mechanism which can be used in the high-pressure multilayer composite pipe and the reliable fitting mechanism for multilayer composite pipe which can be used under an environment that the change in temperature is severe are provided with reference to the accompanying drawings.

Further, in the drawings, the right portion of the fitting mechanism is illustrated mainly as described above, and a left portion thereof is omitted for simplicity. However, it will be understood that the omitted left portion can be integrally formed with the same symmetrical structure of the right portion, for example for connecting two multilayer composite pipes. Alternatively, for example, a threaded portion for being connected to an air conditioner, etc., may be formed on an inner surface or an outer surface of the left portion of the fitting body 1. Such constructions are obvious to those skilled in the art.

What is claimed is:

1. A fitting mechanism for use with multilayer composite pipe having an outermost layer of plastic and an inner layer of metal, the fitting mechanism comprising:
   a fitting body formed of metal, the fitting body including:
      a first threaded portion formed on an inner surface of the fitting body, which is coupled with the outermost layer of plastic;
      a second threaded portion formed on the inner surface adjacent to an inlet of the fitting body, through which a leading end of the multilayer composite pipe is inserted into the fitting body;
      a coupling end portion formed on a portion of the fitting body opposite to the inlet with respect to the first threaded portion; and
      an fitting body slope surface formed on the inner surface between the first threaded portion and the second threaded portion; and
   a ferrule body formed of metal, the ferrule body including:
      a ferrule body slope surface formed on a leading end portion of the ferrule body;
      a third threaded portion formed on an outer surface of the ferrule body to be coupled with the second threaded portion; and
      a ferrule body deformation portion disposed on an end of the ferrule body slope surface opposite to the third threaded portion,
      wherein when the fitting body is coupled to the ferrule body by fastening the third threaded portion of the ferrule body with the second threaded portion of the fitting body, the fitting body slope surface is impinged onto the ferrule body slope surface forming a metal-to-metal fluid tight contact therebetween and causing the ferrule body deformation portion to be deflected inwardly, tightened around and penetrate into the outermost layer of plastic, and the outermost layer of plastic of the leading end of the multilayer composite pipe disposed within the fitting body impinges onto the coupling end portion forming a fluid tight contact therebetween.

2. The fitting mechanism of claim 1, further comprising:
   a metal layer contact prevention means disposed between the coupling end portion of the fitting body and the leading end of the multilayer composite pipe.

3. The fitting mechanism of claim 1, further comprising:
   a fitting body sealing slope surface and a ferrule body sealing slope surface, which are configured to be continued to the fitting body slope surface and the ferrule body slope surface, respectively, and which have the same angle,
   wherein when the fitting body is coupled to the ferrule body by fastening the third threaded portion of the ferrule body with the second threaded portion of the fitting body, the fitting body sealing slope surface impinges onto the ferrule body sealing slope surface to form an metal to metal sealinging contact therebetween.

4. The fitting mechanism of claim 2, further comprising:
   a fitting body sealing slope surface and a ferrule body sealing slope surface, which are configured to be continued to the fitting body slope surface and the ferrule body slope surface, respectively, and which have the same angle,
   wherein when the fitting body is coupled to the ferrule body by fastening the third threaded portion of the ferrule body with the second threaded portion of the fitting body, the fitting body sealing slope surface impinges onto the ferrule body sealing slope surface to form an metal to metal sealinging contact therebetween.

5. The fitting mechanism of claim 2, further comprising:
an inner tightening portion which is a tapered portion disposed between the coupling end portion of the fitting body and the first threaded portion,
wherein when the fitting body is coupled to the ferrule body by fastening the third threaded portion of the ferrule body to the second threaded portion of the fitting body, the outermost layer of plastic is compressed by the inner tightening portion to form a fluid tight contact therebetween.

6. A fitting mechanism for use with multilayer composite pipe having an outermost layer of plastic and an inner layer of metal, the fitting mechanism comprising:
a fitting body formed of metal, the fitting body including:
  a first threaded portion formed on an inner surface of the fitting body, which is coupled with the outermost layer of plastic;
  a second threaded portion formed on the inner surface adjacent to an inlet of the fitting body, through which a leading end of the multilayer composite pipe is inserted into the fitting body;
  a coupling end portion formed on a portion of the fitting body opposite to the inlet with respect to the first threaded portion; and
  an fitting body slope surface formed on the inner surface between the first threaded portion and the second threaded portion; and
a ferrule body formed of metal, the ferrule body including:
  a ferrule body slope surface formed on a leading end portion of the ferrule body;
  a third threaded portion formed on an outer surface of the ferrule body to be coupled with the second threaded portion; and
  a ferrule body deformation portion disposed on an end of the ferrule body slope opposite to the third threaded portion; and
  a metal layer contact prevention means disposed between the coupling end portion of the fitting body and the leading end of the multilayer composite pipe disposed within the fitting body,
wherein a portion of the outermost layer of plastic of the leading end of the multilayer composite pipe within the fitting body is removed exposing the inner layer of metal, and
wherein when the fitting body is coupled to the ferrule body by fastening the third threaded portion of the ferrule body with the second threaded portion of the fitting body, the fitting body slope surface is impinged onto the ferrule body slope surface forming a metal-to-metal fluid tight contact therebetween and causing the ferrule body deformation portion to be deflected inwardly, tightened around and penetrate into the outermost layer of plastic, and the leading end of the multilayer composite pipe impinges onto the metal layer contact prevention means forming a fluid tight contact between the leading end of the multilayer composite pipe, the metal layer contact prevention means and the coupling end portion.

7. The fitting mechanism of claim 6, further comprising:
an inner tightening portion which is a tapered portion disposed between the coupling end portion of the fitting body and the first threaded portion,
wherein when the fitting body is coupled to the ferrule body by fastening the third threaded portion of the ferrule body to the second threaded portion of the fitting body, the outermost layer of plastic is compressed by the inner tightening portion to form a fluid tight contact therebetween.

* * * * *